United States Patent [19]
Garrett

[11] Patent Number: 5,617,672
[45] Date of Patent: Apr. 8, 1997

[54] PLANT GROWTH MEDIA AND PROCESS FOR USING SAME

[75] Inventor: J. Thomas Garrett, Florence, S.C.

[73] Assignee: Clemson University, Clemson, S.C.

[21] Appl. No.: 467,360

[22] Filed: Jun. 6, 1995

[51] Int. Cl.$^6$ ........................................................ A01G 1/00
[52] U.S. Cl. ........................................................ 47/58
[58] Field of Search ........................ 47/58, 59, DIG. 10, 47/64, 74, 59 C, 59 CD, 58.09, 58.1, 58.23; 71/28, 64.04, 903

[56] References Cited

U.S. PATENT DOCUMENTS 3,110,129  11/1963  Baumann ........................... 71/903

FOREIGN PATENT DOCUMENTS 2732304  1/1979  Germany ........................... 47/59 CD

OTHER PUBLICATIONS

Bunt, A.C., "Urea Formaldehyde Foam Resins" *Modern Potting Composts,* The Penn. St. U. Press University Parks, PA. 1978, p. 41.

Laurie, A., et al., "The Use of Minerals by Plants" *Commercial Flower Forcing* 7th Ed., MaGraw–Hill Book Co., N.Y. pp. 158–162.

Primary Examiner—James R. Feyrer
Attorney, Agent, or Firm—Dority & Manning, P.A.

[57] ABSTRACT

A method for controlling the growth rate of plants is provided. The method is directed to using a ureaformaldehyde foam composition blended with a soil formulation. Depending upon the amount of foam added to the soil, the resulting mixture can be used to selectively increase or decrease plant growth rates. The ureaformaldehyde foam can also be used to increase the germination rate of seeds and to increase the percentage of seeds that germinate.

27 Claims, 3 Drawing Sheets

PLANT GROWTH MEDIA AND PROCESS FOR USING SAME

BACKGROUND OF THE INVENTION

The present invention relates generally to a plant growth media and more particularly to a process for using the plant growth media to control plant growth rates, to increase the germination rate of seeds and to increase the number of seeds that germinate.

Many food, flower and forest crops are first established as transplants grown from seed or vegetative tissue prior to being planted in an open field. The purpose of first establishing the crops as transplants is to enhance their survivability, to reproduce more uniform plants, and to promote early plant development under controlled environmental conditions. As used herein, a transplant is referred to as a plant first grown in one environment and then later removed or transferred elsewhere for further growth. Most transplants are grown in greenhouses or under other similarly controlled conditions. Some commercial crops, such as celery, are developed entirely from transplants.

When producing transplants, perhaps the most important objective is to grow a sturdy and healthy plant capable of surviving not only transportation but also relocation to a new environment, such as an open field. In most situations, it is advantageous to grow healthy plants as quickly as possibly. However, under some circumstances it is also desirable to slow the normal growth rate of the transplant. Growth rates are preferably controlled so that the plants are ready to be transplanted within a particular time frame. For instance, plant growth schedules may be adjusted to correspond to growing seasons, to fulfill a market shortage, to fulfill a particular customer's needs or even to have plants available on a continuous basis.

Currently, transplant producers are, in general, using two different methods to control and regulate plant growth. In one method, plant development is altered by changing the growing conditions of the plant. Specifically, the temperature, the supply of light, the amount of water or the amount of nutrients fed to the plant are varied depending upon the desired result. For instance, in order to retard plant growth, plants are typically sprayed with cold water, fed limited amounts of nutrients and/or exposed to limited amounts of light. However, such methods traumatize the plants making them weak and less durable. In fact, some plants never recover from the trauma and, if a food crop is involved, can result in a reduced yield.

Another method of altering plant growth is to spray the transplants with an organic compound. Such compounds have been used to primarily retard the growth rate of the plants. However, due to federal regulations, organic compounds cannot be used on all types of plants. Specifically, these compounds are not fit for human consumption and therefore have been banned from use on food crops.

As such, there currently exists a need for a product and a method that can be used to control the growth rate of plants, and specifically transplants. The present invention recognizes and addresses the above-described disadvantages and deficiencies of prior art methods. In very general terms, the present invention is directed to a plant growth media that can selectively be used to increase or retard plant growth rates while still producing healthy and viable plants. The plant growth media basically comprises a soil formulation mixed with different concentrations of a ureaformaldehyde foam. Depending upon the particular concentration, the ureaformaldehyde foam increases or decreases the growth rate of plants without any adverse side effects. Further, the soil compositions containing the ureaformaldehyde foam provide many other additional benefits and advantages as will be described hereinafter.

In the past, ureaformaldehyde compositions and various foaming compounds have been used in various plant related processes for various reasons. However, as will be evident, particular features and aspects of the present invention remain absent from the prior art.

One particular prior art method is disclosed in an article entitled "Ureafoam As An Amendment For Container Media of Croton" by Ben-Jaacov et al. The article is directed to the use of Hydrosoil, a ureafoam, as an amendment to a growth media. Specifically, the Hydrosoil was tested to determine its water holding capacity. In conclusion, the article states that the addition of Hydrosoil does not improve growth and only slightly reduced days to wilt.

A process and composition for conditioning soil by treating the soil with an iron salt and at least one polymer in the presence of a protein substance is disclosed in U.S. Pat. No. 4,575,391 to DeBoodt et al. The polymer can be a ureaformaldehyde resin. The mixture is preferably used in the form of an aqueous solution or dispersion which is sprayed over the surface of the soil in order to bind the soil particles together.

In U.S. Pat. No. 4,473,390 to Teufel, a soil product is disclosed made from straw coated with a water insoluble material. Examples of water insoluble materials include ureaformaldehyde resin, phenol formaldehyde resin and polyvinylacetate. The straw and material are mixed, formed into blocks, and then reduced to a usable particle soil like size. The soil product may be used alone or in combination with other materials such as natural soil. The soil product slowly decomposes over time and in some cases can provide a release of nutrients as it decomposes.

U.S. Pat. No. 3,812,619 to Wood et al. is directed to horticultural foam structures. The foam structures are prepared by reacting an isocyanate polyoxyethylene polyol reactant with large amounts of an aqueous reactant containing seeds or the like. Further, water soluble or water dispersible materials useful for seed germination and plant growth may be added to the aqueous reactant. The resultant foam structures can then be used as plant potting media, matrices for flower arrangements, or for supporting seedlings.

A plant substrate body is disclosed in U.S. Pat. No. 3,799,755 to Rack. The plant substrate body is made from peat and standard soil that has been dried and mixed with a liquid composition of reactants including a blowing agent which forms an elastic polyurethane foam. When the mixture is foamed, the peat and soil is organically bonded by the foam to form the substrate body. The foam can contain from about 20% to 60% of the peat and standard soil. The substrate body is for permanently supporting the growth of plant roots.

Other prior art methods directed to fertilizers and soil improving materials are disclosed in U.S. Pat. Nos. 3,373,009, 3,417,171, 3,705,794, 3,713,404, 4,190,428, and 4,411,683. In particular, solid control released ureaformaldehyde fertilizer compositions and other foamed, fertilizing containing compositions are disclosed. An aqueous solution containing a ureaformaldehyde precondensate for preventing soil erosion is disclosed in U.S. Pat. No. 4,743,288, while a composite foam plant growth medium including a water and soluble open-celled foamed polyurethane matrix having expanded cellular thermoplastic particles dispersed therein is disclosed in U.S. Pat. No. 3,798,836.

Thus, the prior art describes and discloses various fertilizer and soil agents. However, the prior art fails to disclose a method or soil amendment that can be used to effectively control the growth rate of plants. Further, the prior art fails to disclose a process for using a ureaformaldehyde foam for controlling plant growth rates, including its use for increasing germination rates and plant uniformity.

SUMMARY OF THE INVENTION

The present invention recognizes and addresses the foregoing disadvantages, and others of prior art constructions and methods.

Accordingly, it is an object of the present invention to provide a soil amendment for combining with conventional soil formulations in different concentrations for selectively increasing or decreasing the growth rate of plants.

It is another object of the present invention to provide a method for controlling the growth rate of plants.

It is another object of the present invention to provide a soil amendment that increases seed germination rates.

Still another object of the present invention is to provide a soil amendment that also promotes the germination of seeds.

It is another object of the present invention to provide a method for increasing plant growth rates.

Another object of the present invention is to provide a soil amendment and method that produces healthy and durable transplants.

Still another object of the present invention is to provide a soil amendment that acts as a wetting agent for conventional soil formulations.

Another object of the present invention is to provide a soil amendment that controls water distribution within a soil composition.

These and other objects of the present invention are achieved by providing a method for controlling the growth rate of a plant. The method includes the step of placing a plant into a soil mixture. The soil mixture includes a soil blended with a foam material. The foam material is added to the soil in an amount effective to control the growth rate of the plant such that, depending upon the amount, the growth rate of the plant is selectively increased or decreased.

In one embodiment, the foam material is a ureaformaldehyde foam. In particular, the ureaformaldehyde foam can be predominantly open-celled and can have a bulk density of about one pound per cubic foot. The foam can be present within the soil mixture in an amount from about 5% to about 60% by volume in order to increase the growth rate of the plant. On the other hand, in order to decrease the growth rate of the plant, the foam can be present in an amount from about 50% to about 90% by volume. The actual amount will depend upon the particular plant being grown.

The soil mixed with the foam can include any conventional soil, dirt, top soil, a potting soil, peatlite, peat moss or mixtures thereof. The plant being grown in the soil mixture can be a vegetable or a flowering plant if desired.

These and other objects are also achieved by providing a process for treating a soil formulation in order to enhance the germination rate of seeds and to control plant growth rates. The process includes the step of combining a conventional soil formulation with a foam material to form a blended soil mixture. The foam material can be a ureaformaldehyde foam and can be present within the mixture in an amount from about 5% to about 90% by volume. Depending upon the amount of the foam present, the soil mixture can be used to selectively increase or decrease the normal growth rate of a plant grown therein without weakening or traumatizing the plant.

In order to increase plant growth rates, the ureaformaldehyde foam can be present in an amount from about 5% to about 60% by volume and preferably between about 15% and about 35% by volume. In order to decrease growth rates, the foam can be present in an amount from about 50% to about 90% by volume, and preferably between about 50% and about 75% by volume.

The present invention is also directed to a method of sowing seeds for increasing germination rates, for increasing the number of seeds that germinate and for causing the seeds to germinate more uniformly. The method includes the step of planting seeds from a preselected plant into a plant growth media. The plant growth media includes a soil formulation combined with a foam material. The foam material can be a predominantly open celled ureaformaldehyde foam being present within the media in an amount from about 5% to about 90% by volume. The soil formulation mixed with the foam material can include any soil, potting soil, peatlite, peat moss, or mixtures thereof.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

DETAILED DESCRIPTION OF PREFERRED EMBODIMENTS

Figure 1:
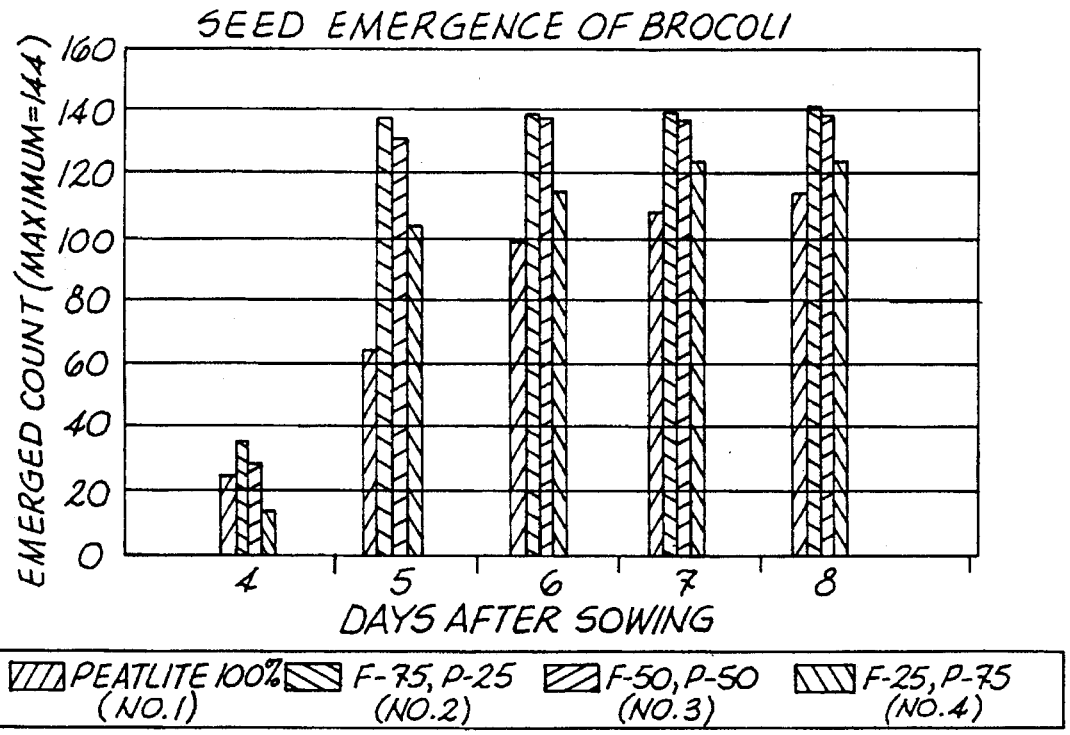
FIG. 1 is a graphical representation of germination rates of broccoli plants grown in comparative soil treatments as described in Example 1.

It is to be understood by one of ordinary skill in the art that the present discussion is a description of exemplary embodiments only, and is not intended as limiting the broader aspects of the present invention.

Generally, the present invention is directed to a plant growth media comprising a ureaformaldehyde foam that can be used to control the growth rate of plants when mixed in various proportions with other standard soil formulations. Specifically, the ureaformaldehyde foam can be used with transplants in order to either increase the normal growth rate of the plants or to decrease the growth rate of the plants. Further, the growth rate is controlled without any adverse affects on the plants. In fact, plants grown using the ureaformaldehyde foam are typically healthier and stronger than plants grown in conventional soil formulations alone.

When used as a soil amendment, the ureaformaldehyde foam of the present invention has unexpectedly demonstrated other advantages. For instance, when using the ureaformaldehyde foam seed germination rates have increased along with the percentage of seeds that germinate. Further, seed germination is more uniform meaning that the seeds germinate at approximately the same time.

A further advantage to using the ureaformaldehyde foam of the present invention is its effect on water distribution in the foam and soil mixture. For instance, the foam only retains optimum amounts of water for plant growth. If the plant is overwatered, the excess water filters through the foam and soil mixture and is discharged out a drainage hole if present in the container. Also, the ureaformaldehyde foam acts as a wetting agent for the soil formulation as will be described in more detail hereinafter.

In a preferred embodiment of the present invention, the ureaformaldehyde foam used is a foam marketed under the trade name PLASTSOIL, which can be obtained from CoverFoam Services, Inc., located in Florence, S.C. PLASTSOIL, which is a predominantly open celled hydrophilic foam, has an appearance similar to that of "cotton candy" and has a bulk density of approximately 1 pound per cubic foot. The foam can be compressed to about 1/30 of its original size. Also, the foam is non-toxic and is slowly biodegradable. Specifically, depending upon the temperature and microbe activity, the foam will normally break down in a period of from about a few weeks to a few months. Upon biodegradation, the foam releases small amounts of nitrogen and phosphorous into the soil which are known plant fertilizers.

PLASTSOIL is a cellular plastic composition made from reacting formaldehyde and urea in particular concentrations. Also, a surfactant and a catalyst can be added to the reaction. Unique to PLASTSOIL, carbohydrates, such as glucose, fructose, maltose, and sucrose can be incorporated into the formulation prior to producing the foam. The carbohydrates control shrinkage in the foam and make the foam less brittle. The method of making ureaformaldehyde resin foam using carbohydrates is disclosed in U.S. Pat. No. 4,107,105 to Korf entitled Cellular Urea-Formaldehyde Resin and Method of Preparing the Same, which is fully incorporated herein by reference thereto. Although unknown, it is possible that the unexpected results achieved by the process of the present invention are attributable to the carbohydrate additives.

As discussed above, PLASTSOIL is a predominantly open celled foam. If viewed under magnification, PLASTSOIL would appear as units of small spheres. The spheres which form a network of capillaries within the foam are porous allowing water molecules to diffuse therein. Further, the foam is hydrophilic in nature. When used in the process of the present invention, preferably PLASTSOIL is broken down and used in a powdered form.

When using the ureaformaldehyde foam in accordance with the present invention, the foam, in powdered form, is preferably mixed with a conventional soil formulation and used as a plant growth media. The foam can be added to a soil formulation in an amount from about 5% to about 90% by volume depending upon the circumstances and results desired. Any soil formulation can be mixed with the ureaformaldehyde foam and used in the process of the present invention. As used herein, a soil formulation includes any media that is used to grow plants. Examples of various soil formulations that can be mixed with the foam include natural soils, potting soils, peatlite which is a mixture of Canadian sphagnum peat moss and vermiculite, peat moss, and mixtures thereof. The choice of a proper soil formulation to mix with the ureaformaldehyde foam depends on a number of factors including the type of plant, the growing conditions, and the results desired.

As described above, various proportions of the ureaformaldehyde foam can be added to a soil formulation in order to control the growth rate of the plant. In particular, the process of the present invention is directed to transplants although the process can work equally as well on all other types of plants. Although dependent upon the particular plant being grown and the soil formulation chosen, in order to increase the growth rate of plants, the ureaformaldehyde foam can be added to a soil in an amount from about 5% to about 60% by volume. Preferably, in order to increase growth rates, the foam is present in an amount from about 15% to about 35% by volume. In order to decrease or retard growth rates of plants, on the other hand, the ureaformaldehyde foam can be present in an amount from approximately 50% by volume or higher and preferably from about 50% to about 75% depending upon the particular plant being grown. When the foam material is present in an amount between about 50% to about 60%, various factors including the particular plant being grown, the type of base soil incorporated into composition and the growing conditions will determine whether the foam material will cause an increase or a decrease in plant growth rates.

Regardless of the amount of the ureaformaldehyde foam added to the soil or the resulting effect on the plant, the addition of the foam does not cause any adverse side effects on the plants. To the contrary, addition of the foam not only controls the growth rate but also produces stronger and sturdier plants. For instance, one method of determining the strength and durability of a plant is to measure its cell density. In particular, a stronger and more durable plant usually contains more cells per unit volume of plant tissue. Plants with large elongated cells typically are not as durable as plants with smaller cells. Plants grown according to the process of the present invention have exhibited higher cell densities regardless of whether the growth rate was increased or decreased.

Another indicator used to determine the durability of a plant is the extent of its root development. In general, the greater the extent of root development in relation to shoot development, the more durable the plant is. Plants grown according to the process of the present invention, have exhibited superior root development. In particular, plants grown according to the process of the present invention with decreased growth rates have exhibited comparatively high root growth in comparison to shoot growth. In fact, in some of the plants tested using the foam material, the normal shoot growth rate was decreased while simultaneously increasing the normal root growth rate. As such, plants produced according to the process of the present invention with decreased growth rates can actually be stronger and more durable than plants grown under regular conditions.

In controlling the growth rate of plants, the ureaformaldehyde foam also causes the plants to grow uniformly. In other words, plants grown according to the process of the present invention typically grow at the same rate. Uniform growth rates allow for the plants to be transplanted and/or harvested at the same time.

In general, it is presently unknown how the ureaformaldehyde foam improves plant growth performance and how it controls plant growth rates. However, it is believed that a number of factors including the physical characteristics of the foam cause these effects. In particular, it is believed that when the foam is mixed with a soil, better aeration occurs. It is believed that the foam provides to the root system a ratio of air to water that is optimum for plant development. By increasing the proportionate amount of the ureaformaldehyde foam in the soil, it is possible that the rate of nutrient intake by the roots of the plant is decreased which corresponds to the slower growth rates. However, it is also possible that other mechanisms are at work which are influencing the results obtained.

Besides controlling the growth rate of plants, the ureaformaldehyde foam of the present invention can also be used to increase the germination rate of seedlings. Also, besides increasing germination rates, the foam causes more seeds to germinate and causes the seeds to germinate at the same time. Uniform germination rates allow large groups of plants to be planted together and thereafter transplanted or harvested according to a common time schedule.

Besides affecting growth rates and seed germination rates, the ureaformaldehyde foam also acts as a wetting agent for the soil. This is a particularly advantageous characteristic when mixing the foam with certain soil formulations. For instance, soil formulations containing peat including some potting soils do not readily absorb water, especially during their initial use. Combining the ureaformaldehyde foam with these types of soils causes water to be more readily absorbed into the soil and dispersed.

Further, the ureaformaldehyde foam can also be used to prevent the overwatering of plants. As described above, the foam material is an absorbent. However, the foam only absorbs an amount of water sufficient for plant development. Excess water, if added to a plant grown in a growth media containing the foam, will not collect and accumulate within the foam but will be filtered therethrough. If, for instance, the growing plant is contained within a container having drainage ports, the excess water will drain out and not drown or harm the plant.

It is believed that any plant can be used in the process of the present invention for controlling growth rates and/or seed germination rates. In particular, the growth and improved germination rates of all transplants can be controlled using the ureaformaldehyde foam combined with a soil in the correct proportions. Such transplants would include food crops such a broccoli, cabbage, tomatoes and peppers, or flowers including marigolds, petunias, and salvias.

However, besides being used as a potting soil for transplants, the ureaformaldehyde foam can also be used in other plant systems. For instance, in another embodiment, the ureaformaldehyde foam can be mixed with the soil in an open field. For example, a predetermined amount of foam can be injected into a crop field and then later mixed with the top soil. Besides enhancing crop growth rates as desired, the foam would also allow proper drainage and would prevent overwatering during rain storms.

In another embodiment, the ureaformaldehyde foam can also be used in hydroponic systems. Generally, hydroponics refer to a system of growing plant tissue using a liquid growth media. In a hydroponic system, the plant tissue can be placed and grown on top of the foam. In this system, preferably no soil would be added to the foam. The foam would allow the plant tissue to absorb the growth media fluid while also providing a substrate for root development.

The present invention may be better understood by reference to the following examples.

EXAMPLE 1

A ureaformaldehyde foam and specifically PLASTSOIL marketed by CoverFoam Services, Inc. in Florence, S.C. was mixed with various soil formulations and used to germinate and grow several vegetables. In particular, the ureaformaldehyde foam used was in the form of a powder. The foam was broken down into a powder by being rubbed across a screen having an opening size of about ½ inch. The powdered foam was then blended in varying concentrations with peatlite. The peatlite and foam were mixed using a mechanical mixer.

The first vegetable selected for study was broccoli (*Brassica oleracea,* Botrytis group cv. Baccus). Specifically, broccoli seeds were placed in cells contained in Todd Planter Flats obtained from Speedling, Inc. located in Sun City, Fla. Each cell contained within the flats measured 53×53×75 mm forming an inverted pyramid capable of containing approximately 70 cubic centimeters of a growing media. Four different mixtures of peatlite and PLASTSOIL were prepared as is listed in Table 1. Peatlite is a conventional soil formulation containing Canadian sphagnum peat moss and vermiculite. The peatlite used in the following experiments was obtained from Conrad Fafard, Inc. located in Anderson, S.C. Specifically, 144 seeds of broccoli were placed in each of the following compositions.

TABLE 1

| Plant Growth Media Compositions | |
|---|---|
| Treatment No. | Composition |
| 1 (Control) | Peatlite 100% |
| 2 | Peatlite 25%, PLASTSOIL 75% |
| 3 | Peatlite 50%, PLASTSOIL 50% |
| 4 | Peatlite 75%, PLASTSOIL 25% |

The flats containing the seeds and various growth medias were arranged randomly on standard greenhouse benches having expanded metal platforms designed to facilitate air pruning of any roots growing beyond the designated cell. Each cell contained a drainage hole which was plugged loosely with sterile cotton in order to prevent media loss after filling.

Greenhouse temperatures were maintained at less than 90° F. during the day and at approximately 65° F. during the night. The plants were hand watered daily. Also, fertilizers were hand applied, using sprinkler cans, twice weekly beginning when the seedlings had emerged. The fertilizer used was Peters 20-20-20 at 1 tablespoon per gallon of water plus micronutrients supplied from Hoagland's modified half strength micronutrient solution at 0.5 oz per gallon of water. The experiment was replicated four times and the results were averaged.

Referring to FIG. 1, a graphical illustration of seed emergence count over the first eight-day period is illustrated. In the legend, "F" represents the ureaformaldehyde foam while "P" stands for the peatlite. As shown, the addition of the ureaformaldehyde foam in the soil treatment substantially enhanced the rate of seed germination. Seedling emergence was advanced approximately three to four days when a proportionate amount of ureaformaldehyde foam was mixed with the peatlite. In particular, soil treatment no. 2 containing 75% ureaformaldehyde foam produced the best results.

As also shown by the graph, a higher percentage of seeds germinated when the ureaformaldehyde foam was present in the soil treatment. Also, seed germination was more uniform for soil treatment nos. 2, 3 and 4. Specifically, most of the seeds germinated on day five when placed in a soil treatment containing foam. In comparison, seeds placed in 100% peatlite gradually emerged on different days.

After thirty-seven days of growth, sixteen broccoli plants from each soil treatment were harvested. The soil was carefully washed from the root systems and each plant was subsequently blotted dry with paper towels to remove all free moisture. Plant tops and root systems were cut at the ground line and then weighed. The results are contained in Table 2.

TABLE 2

Media Effects on Broccoli After 37 Days

| Treatment No. | Average Fresh Shoot Weight (g) | Average Fresh Root Weight (g) | Root:Shoot Ratio |
|---|---|---|---|
| 1 (Control) | 5.83 | 0.78 | 0.134 |
| 2 | 3.66 | 0.82 | 0.223 |
| 3 | 3.27 | 0.61 | 0.185 |
| 4 | 6.56 | 1.65 | 0.252 |

As shown in Table 2, depending upon the proportionate amount of the ureaformaldehyde foam contained in the soil treatment, the growth of broccoli shoots was either increased or decreased. In particular, soil treatment no. 4 corresponding to 25% ureaformaldehyde foam substantially increased shoot growth and root growth in the broccoli plants. Soil treatment no. 4 also resulted in the highest root-to-shoot ratio which is a good indication of durability.

Soil treatments 2 and 3 corresponding to 75% and 50% ureaformaldehyde foam respectively, caused the rate of shoot growth to be decreased in the plants. However, treatments 2 and 3 did not result in an appreciable corresponding decrease in the growth rate of the root systems. In fact, more root growth was observed for soil treatment no. 2 when compared to the control. This result indicates that shoot growth rates can be reduced without damaging or traumatizing the plants.

EXAMPLE 2

The same test and conditions as described in Example 1 were repeated for tomato plants (*Lycopersicum esculentum* Mill cv. Rio Grande).

Figure 2:
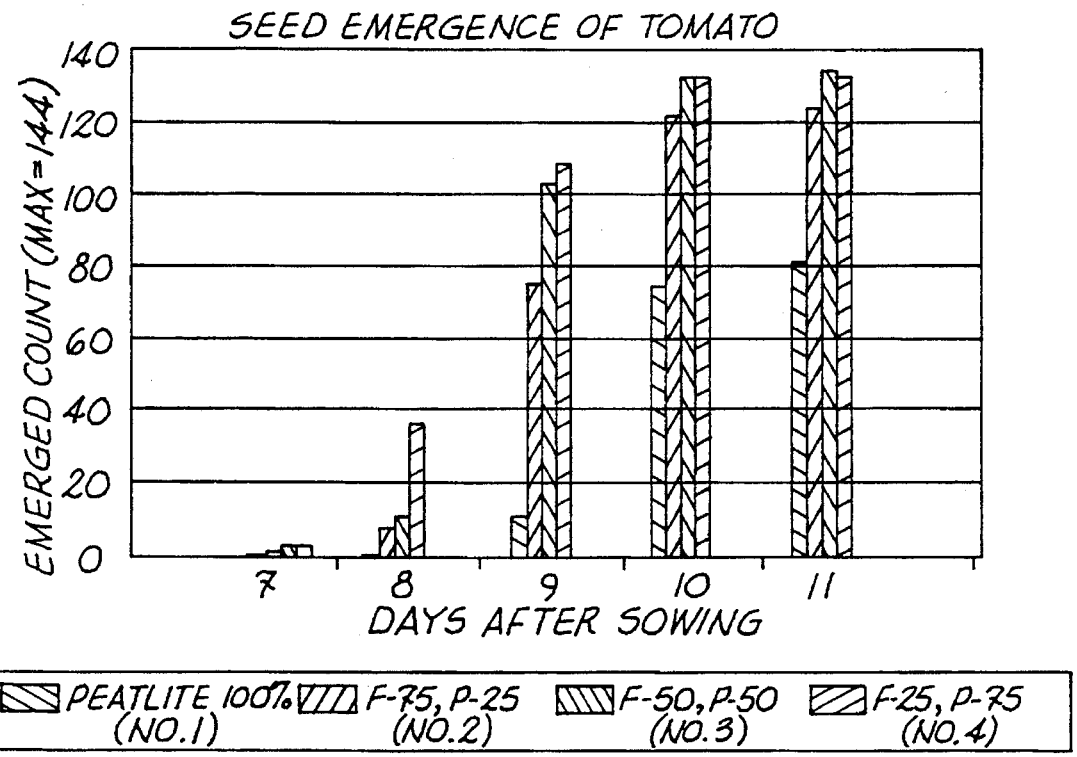
FIG. 2 is a graphical representation of germination rates of tomato plants grown in comparative soil treatments as described in Example 2.

Referring to FIG. 2, a graph of tomato seed germination after eleven days is illustrated. Similar to broccoli, the ureaformaldehyde foam added to the soil treatment caused germination rates to increase, caused a higher percentage of seeds to germinate, and caused seed germination to be more uniform. However, in this example soil treatments 3 and 4 corresponding to 50% ureaformaldehyde foam and 25% ureaformaldehyde foam respectively exhibited the best results.

Thirty-eight days after sowing, 16 tomato plants from each soil treatment were harvested as was described in Example 1. Again, the plant tops and root systems were cut at the ground line and weighed. The following results were obtained.

TABLE 3

Media Effects On Tomato After 38 Days

| Treatment No. | Average Fresh Shoot Weight (g) | Average Fresh Root Weight (g) | Root:Shoot Ratio |
|---|---|---|---|
| 1 (Control) | 7.90 | 1.96 | 0.248 |
| 2 | 4.04 | 1.30 | 0.321 |
| 3 | 4.78 | 1.23 | 0.258 |
| 4 | 9.24 | 2.07 | 0.224 |

As shown above, the ureaformaldehyde foam had a similar effect on tomato plants when compared to the broccoli plants of Example 1. Again, soil treatment no. 4 containing 25% foam caused shoot growth and root growth to increase. When the soil treatment contained 50% of the ureaformaldehyde foam or higher, the plant growth rate was decreased. However, although growth was decreased, soil treatments 2 and 3 resulted in higher root-to-shoot ratios.

EXAMPLE 3

Bell pepper seeds (*Capsicum annuum* L. cv. Gator Belle) were also placed in the soil treatments listed in Table 1 and tested under the conditions described in Example 1. In this experiment however, 720 pepper seeds were placed in each of the four soil treatments.

Figure 3:
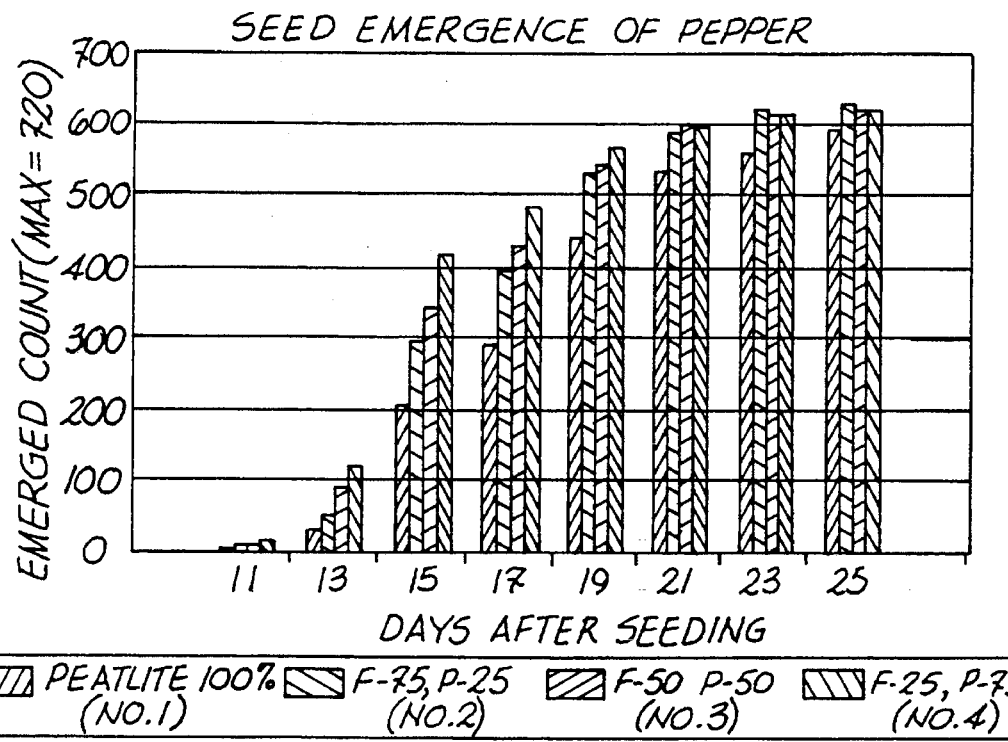
FIG. 3 is a graphical representation of germination rates of pepper plants grown in comparative soil treatments as described in Example 3.

FIG. 3 graphically represents seed emergence twenty-five days after sowing. Again, the addition of the ureaformaldehyde foam to peatlite increased seed germination rates. In particular, soil treatment no. 4 appears to provide the best results although soil treatment no. 2 caused the most seeds to germinate after the twenty-five day period.

After fifty-seven days of growth, 20 pepper plants from each soil treatment were harvested and washed. The plant tops and root systems were separated and weighed. The following results were obtained.

TABLE 4

Media Effects on Pepper After 57 Days

| Treatment No. | Average Fresh Shoot Weight (g) | Average Fresh Root Weight (g) | Root:Shoot Ratio |
|---|---|---|---|
| 1 (Control) | 4.61 | 2.49 | 0.541 |
| 2 | 3.69 | 2.12 | 0.573 |
| 3 | 4.94 | 2.92 | 0.592 |
| 4 | 5.15 | 2.62 | 0.509 |

As shown above, the soil treatments containing 50% or less of the ureaformaldehyde foam caused the growth rate of the pepper plants to increase. Treatment No. 2 containing 75% foam resulted in decreased growth rates similar to Examples 1 and 2. The root-to-shoot ratio was higher for soil treatments No. 2 and 3 when compared to the control containing 100% peatlite.

Figure 4:
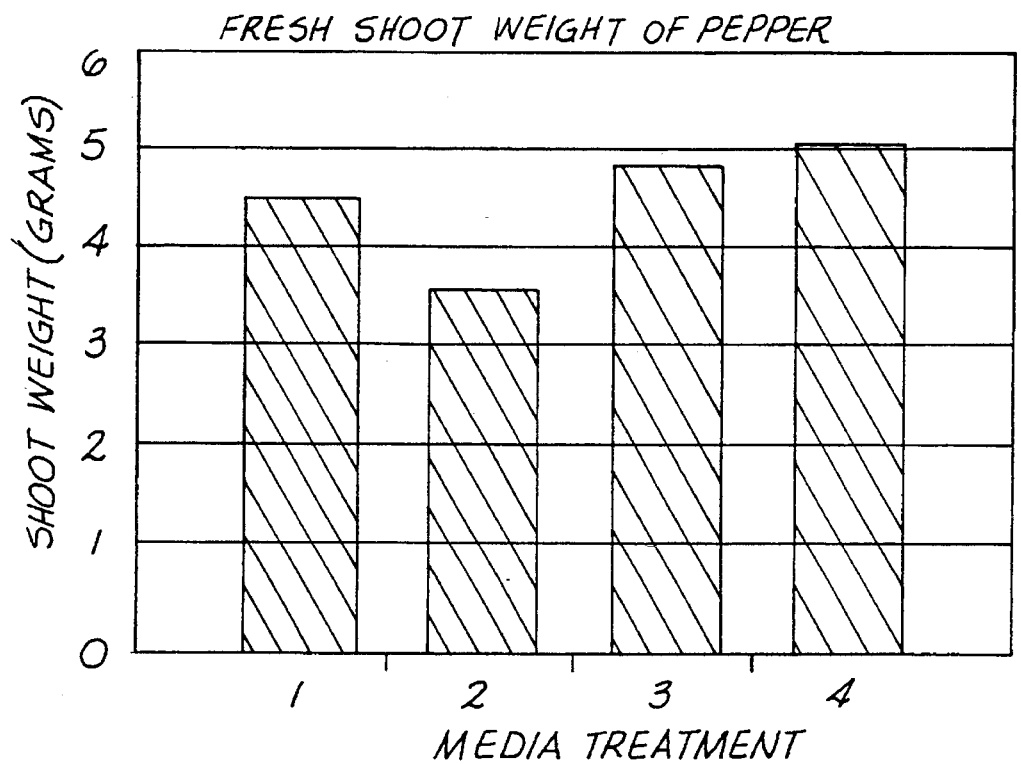
FIG. 4 is a graphical representation of the fresh shoot weight of pepper plants grown in comparative soil treatments as described in Example 3.
Figure 5:
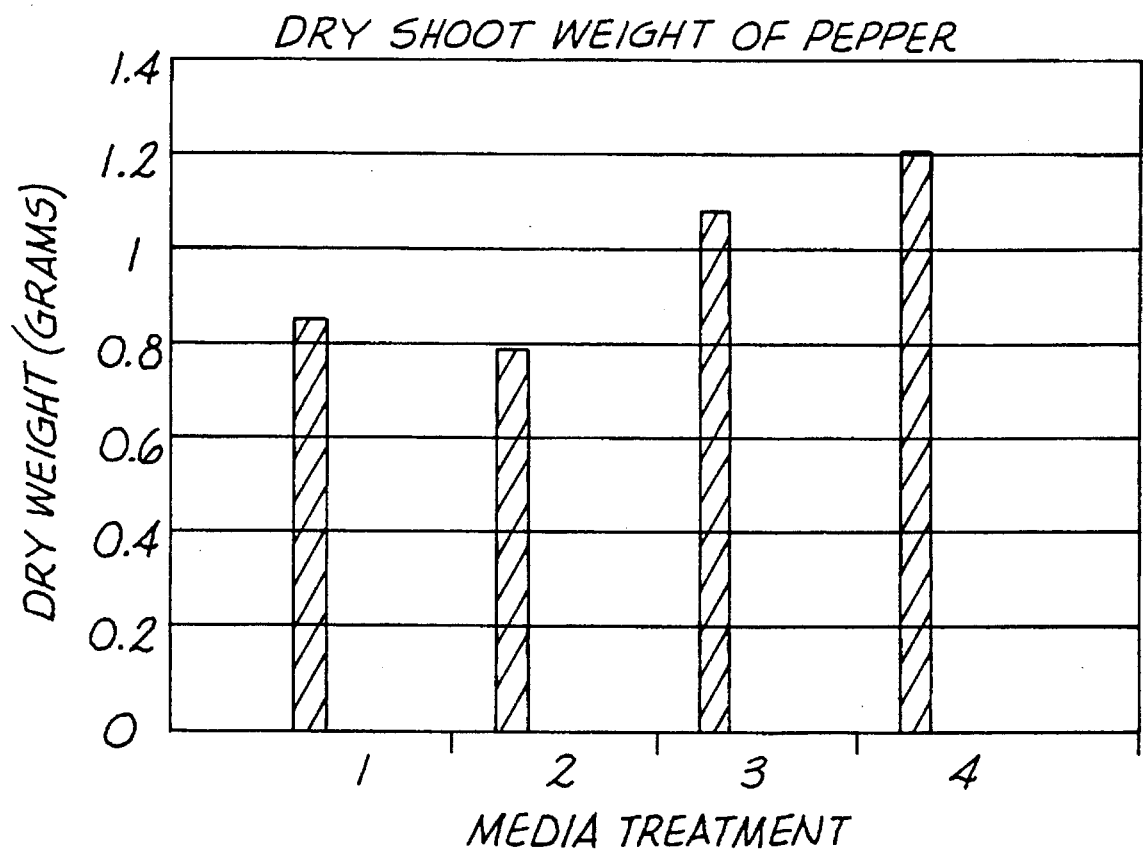
FIG. 5 is a graphical representation of the dry shoot weight of pepper plants grown in comparative soil treatments as described in Example 3.

After weighing the plant tops, the shoots were oven dried at 70° C. for 72 hours after which dry weights were recorded. Referring to FIGS. 4 and 5, FIG. 4 is a graphical representation of fresh shoot weight while FIG. 5, in comparison, is a graphical representation of dry shoot weight for the four soil treatments. In comparing the graphs, it is shown that soil treatments 2, 3 and 4 in FIG. 5 are relatively higher in comparison to soil treatment no. 1 than as shown in FIG. 4. These results indicate that the fresh shoot weight of pepper plants grown in 100% peatlite were more succulent or contained more fluids than the plants grown in soil treatments containing the ureaformaldehyde foam. In other words, the plants grown in the ureaformaldehyde mixture had a higher cell density than the plants grown in the 100% peatlite soil. A higher cell density typically indicates a plant with better durability when transplanted.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to be limitative of the invention so further described in such appended claims.

What is claimed:

1. A method of sowing seeds comprising the step of:

planting seeds from a preselected plant into a plant growth media, said growth media comprising a soil formulation combined with a powdered foam material, said foam material comprising a predominantly open celled ureaformaldehyde foam, said ureaformaldehyde foam being present within said media in an amount effective for increasing germination onset and attainment of said seeds, for increasing the number of seeds that germinate and for causing the seeds to germinate more uniformly in comparison to seeds planted in said soil formulation only, said amount being from 5% to 90% by volume.

2. A method as defined in claim 1, wherein said ureaformaldehyde foam has a bulk density of one pound per cubic feet.

3. A method as defined in claim 1, wherein said soil formulation comprises a material selected from the group consisting of soils, potting soils, peatlite, peat moss, and mixtures thereof.

4. A method as defined in claim 1, wherein said ureaformaldehyde foam includes a carbohydrate additive, said carbohydrate additive comprising a material selected from the group consisting of glucose, fructose, maltose, sucrose and mixtures thereof.

5. A method of growing a healthy and durable plant while simultaneously controlling the rate of cell elongation of said plant, said method comprising the steps of:

a) providing a developing plant, said developing plant having the capability of developing a shoot and a root structure; and b) growing said developing plant in a root medium comprising a soil formulation blended with a powdered foam material, said foam material being made substantially of ureaformaldehyde, said foam material being present within said root medium in an amount effective for controlling the rate of cell elongation of said developing plant in comparison to a developing plant grown in said soil formulation only, the rate of cell elongation of said developing plant being selectively controlled in a manner such that the balance of the top growth to the root growth of said developing plant is preselected as a function of the concentration of the foam material in said root medium.

6. A method as defined in claim 5, wherein said ureaformaldehyde foam material is predominately open celled.

7. A method as defined in claim 5, wherein said foam material has a bulk density of one pound per cubic feet.

8. A method as defined in claim 5, wherein said foam material is hydrophilic.

9. A method as defined in claim 5, wherein said powdered foam material is comprised of a network of microscopic hollow spheres.

10. A method as defined in claim 5, wherein said ureaformaldehyde foam material includes a carbohydrate additive.

11. A method as defined in claim 10, wherein said carbohydrate additive is a material selected from the group consisting of glucose, fructose, maltose, sucrose, and mixtures thereof, said carbohydrate additive being present within said foam material in an amount from 5 percent to 20 percent by weight.

12. A method as defined in claim 5, wherein said foam material is present in said root medium in an amount from 5% to 50% by volume for increasing the rate of cell elongation of the shoot of said plant.

13. A method as defined in claim 5, wherein said foam material is present in said root medium in an amount from 50% to 90% by volume in order to decrease the rate of cell elongation of the shoot of said plant.

14. A method as defined in claim 5, wherein said soil formulation is a material selected from the group consisting of soil, top soil, potting soil, peatlite, peat moss and mixtures thereof.

15. A method as defined in claim 5, wherein said developing plant is a vegetable producing plant.

16. A method as defined in claim 5, wherein said developing plant is a flower producing plant.

17. A method for increasing the cell number and the cell elongation of a plant to render the plant having increased size in comparison to a plant produced in conventional root medium, said method comprising the steps of:

providing a developing plant of selected species, said developing plant having the capability of developing a shoot and a root structure; and planting said developing plant into a plant growth media, said plant growth media comprising a soil formulation blended with a powdered foam material, said foam material comprising a predominately open-celled ureaformaldehyde foam, wherein said foam material is present within said growth media in an amount effective for increasing the rate of cell elongation of the shoot of said developing plant of said selected species in comparison to a developing plant of the same species grown in said soil formulation only, said rate of cell elongation of said shoot being increased without adversely affecting root development.

18. A method as defined in claim 17, wherein said ureaformaldehyde foam is present within said plant growth media in an amount from 5% to 60% by volume.

19. A method as defined in claim 17, wherein said ureaformaldehyde foam is present within said plant growth media in an amount from 15% to 35% by volume.

20. A method as defined in claim 17, wherein said soil formulation is a material selected from the group consisting of soil, potting soil, peatlite, peat moss, and mixtures thereof.

21. A method as defined in claim 17, wherein said foam material is hydrophilic and comprises of a network of microscopic hollow spheres.

22. A method as defined in claim 17, wherein said ureaformaldehyde foam includes a carbohydrate additive present within said foam in an amount from 5 percent to 20 percent by weight, wherein said carbohydrate additive is a material selected from the group consisting of glucose, fructose, maltose, sucrose, and mixtures thereof.

23. A method for decreasing the rate of cell elongation of a plant to render the plant having decreased size in comparison to a plant produced in conventional root medium, said method comprising the steps of:

providing a developing plant of a selected species, said developing plant having the capability of developing a shoot and a root structure; and growing said developing plant in a growth media, said growth media comprising a mixture of a soil formulation blended with a powdered foam material, said foam material comprising a predominately open-celled ureaformaldehyde foam, said foam being present in said growth media in an amount effective for decreasing the rate of cell elongation of the shoot of said developing plant of said selective species in comparison to a developing plant of the same species grown in said soil formulation only, said rate of cell elongation of said shoot being decreased without adversely affecting root development.

24. A method as defined in claim 23, wherein said ureaformaldehyde foam is present within said plant growth media in an amount from 50% to 90% by volume.

25. A method as defined in claim 23, wherein said ureaformaldehyde foam is hydrophilic, has a density of 1 pound per cubic feet and is comprised of a network of microscopic hollow spheres.

26. A method as defined in claim 23, wherein said ureaformaldehyde foam includes a carbohydrate additive.

27. A method as defined in claim 23, wherein the rate of cell elongation of the shoot of said developing plant is decreased while simultaneously increasing the number of cells per unit volume of said plant.

* * * * *